(12) United States Patent
Roy et al.

(10) Patent No.: US 7,639,680 B1
(45) Date of Patent: Dec. 29, 2009

(54) OUT OF BAND DATA BASE SYNCHRONIZATION FOR OSPF

(75) Inventors: Abhay Kumar Roy, San Jose, CA (US); Alexey Dimitrievich Zinin, Cupertino, CA (US); Liem Hong Nguyen, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 694 days.

(21) Appl. No.: 09/971,298

(22) Filed: Oct. 4, 2001

(51) Int. Cl.
*H04L 12/56* (2006.01)

(52) U.S. Cl. .................. 370/389; 370/221; 370/386; 370/400; 370/408; 370/503; 707/201

(58) Field of Classification Search .................. 370/255, 370/389, 392, 396, 395.52, 400, 503, 509, 370/221, 386, 408; 707/200, 201, 203
See application file for complete search history.

(56) References Cited

U.S. PATENT DOCUMENTS

| | | | |
|---|---|---|---|
| 5,519,704 A | 5/1996 | Farinacci et al. | |
| 5,742,820 A * | 4/1998 | Perlman et al. | 707/201 |
| 5,964,841 A | 10/1999 | Rekhter | |
| 6,195,705 B1 | 2/2001 | Leung | |
| 6,724,756 B2 * | 4/2004 | Fourie et al. | 370/360 |
| 6,745,209 B2 * | 6/2004 | Holenstein et al. | 707/203 |
| 6,820,134 B1 * | 11/2004 | Zinin et al. | 709/238 |
| 6,876,625 B1 * | 4/2005 | McAllister et al. | 370/221 |

OTHER PUBLICATIONS

U.S. Appl. No. 09/925,827, Zinin.
U.S. Appl. No. 09/925,800, Zinin.
Moy, J., OSPF Version 2, Request For Comments 2328, Network Working Group, Internet Engineering Task Force, 1998, pp. 1-244.

* cited by examiner

*Primary Examiner*—William Trost, IV
*Assistant Examiner*—Toan D Nguyen
(74) *Attorney, Agent, or Firm*—Cesari and McKenna, LLP (57) ABSTRACT

A method and apparatus resynchronizes a link state database (LSDB) of a non-stop forwarding (NSF) router with the LSDB of a neighboring router ("neighbor") while maintaining an existing adjacency with the neighbor in a computer network. An out-of-band resynchronization process executes on the routers to essentially maintain the existing adjacency between the router and neighbor, rather than resetting that adjacency as defined by a conventional resynchronization approach. By keeping the adjacency "up" from the perspective of a routing protocol, such as the Open Shortest Path First routing protocol, the adjacency can be used for continued data traffic to and from the NSF router.

21 Claims, 9 Drawing Sheets

OUT OF BAND DATA BASE SYNCHRONIZATION FOR OSPF

CROSS-REFERENCE TO RELATED APPLICATIONS

The present invention is related to the following and commonly assigned U.S. Patent Applications:

U.S. patent application Ser. No. 09/925,827, now issued as U.S. Pat. No. 7,065,059 on Jun. 20, 2006, titled, Technique for Restoring Adjacencies in OSPF in a Non-Stop Forwarding Intermediate Node of a Computer Network, and U.S. patent application Ser. No. 09/925,800, now issued as U.S. Pat. No. 6,950,427 on Sep. 27, 2005, titled, Technique for Resynchronizing LSDB in OSPF after a Software Reload in a Non-Stop Forwarding Intermediate Node of a Computer Network, which applications were filed on Aug. 9, 2001 and which are hereby incorporated by reference as though fully set forth herein.

FIELD OF THE INVENTION

This invention relates generally to computer networks, and more particularly, to resynchronization of a routing protocol database within a non-stop forwarding intermediate node of a computer network.

BACKGROUND OF THE INVENTION

A computer network is a geographically distributed collection of interconnected communication links and subnetworks for transporting data between nodes, such as computers. Many types of computer networks are available, with the types ranging from local area networks (LANs) to wide area networks (WANs). A LAN is an example of a subnetwork that provides relatively short distance communication among the interconnected stations, whereas a wide area network enables long distance communication over links provided by public or private telecommunications facilities. The nodes typically communicate by exchanging discrete frames or packets of data according to predefined protocols. In this context, a protocol consists of a set of rules defining how the nodes interact with each other.

Computer networks may be further interconnected by an intermediate node, called a router, to extend the effective "size" of each network. Since management of a large system of interconnect computer networks can prove burdensome, smaller groups of computer networks may be maintained as routing domains or autonomous systems. The networks within an autonomous system are typically coupled together by conventional intradomain routers. These routers manage communication among local networks within their domains and communicate with each other using an intradomain routing (or an interior gateway) protocol. An example of such a protocol is the Open Shortest Path First (OSPF) routing protocol described in Request for Comments (RFC) 2328, OSPF Version 2, by J. Moy (1998). The OSPF protocol is based on link-state technology and, therefore, is hereinafter referred to as a link state routing protocol.

Each router running the link state routing protocol maintains an identical link state database (LSDB) describing the topology of the autonomous system (AS). Each individual piece of the LSDB is a particular router's local state, e.g., the router's usable interfaces and reachable neighbors or adjacencies. As used herein, neighboring routers (or "neighbors") are two routers that have interfaces to a common network, wherein an interface is a connection between a router and one of its attached networks. Moreover, an adjacency is a relationship formed between selected neighboring routers for the purpose of exchanging routing information and abstracting the network topology. One or more router adjacencies may be established over an interface.

The adjacencies are established and maintained through the use of a conventional Hello protocol. Broadly stated, the Hello protocol ensures that communication between neighbors is bi-directional by periodically sending Hello packets out all router interfaces. Bi-directional communication is indicated when the router "sees" itself listed in the neighbor's Hello packet. On broadcast and non-broadcast multi-access (NBMA) networks, the Hello protocol elects a designated router (DR) and backup designated router (BDR) for the network.

The infrastructure of a typical router comprises functional components organized as a control plane and a data plane. The control plane includes the functional components needed to manage the traffic forwarding features of the router. These features include routing protocols, configuration information and other similar functions that determine the destinations of data packets based on information other than that contained within the packets. The data plane, on the other hand, includes functional components needed to perform forwarding operations for the packets.

For a single processor router, the control and data planes are typically implemented within the single processor. However, for some high performance routers, these planes are implemented within separate devices of the intermediate node. For example, the control plane may be implemented in a supervisor processor, such as a route processor, whereas the data plane may be implemented within a hardware-assist device, such as a co-processor or a forwarding processor. In other words, the data plane is typically implemented in a specialized piece of hardware that is separate from the hardware that implements the control plane.

The control plane generally tends to be more complex than the data plane in terms of the quality and quantity of software operating on the supervisor processor. Therefore, failures are more likely to occur in the supervisor processor when executing such complicated code. In order to ensure high availability in an intermediate network node, it is desirable to configure the node such that if a failure arises with the control plane that requires restarting and reloading of software executing on the supervisor processor, the data plane continues to operate correctly. Restarting and reloading of control plane software may be necessary because of a failure with the routing protocol process, e.g., an OSPF module, or a software upgrade to the OSPF module. A router that is configured to enable its data plane to continue packet forwarding operations during restart and reload of the control plane software is referred to as a non-stop forwarding (NSF) capable router.

Each router distributes its local state throughout the domain in accordance with an initial LSDB synchronization process and a conventional asynchronous flooding algorithm. The initial LSDB synchronization procedure is performed when the router is initially connected to the network, whereas the flooding procedure is performed to ensure continuous LSDB synchronization in the presence of topology changes after the initial procedure is completed. In order to guarantee convergence of a link state routing protocol, it should be ensured that link state protocol data units (PDUs) that originate after an initial LSDB synchronization between neighbors is completed and delivered to all routers within the flooding scope limits. These limits may comprise an area or the entire AS, depending on the protocol and the type of link-state PDU. An area is a collection or group of contiguous networks and nodes (hosts), together with routers having interfaces to any of the included networks. Each area runs a separate copy of the link state routing algorithm and, thus, has its own LSDB. In the case of OSPF, the PDU is a link state advertisement (LSA) packet comprising a unit of data describing the local state of a router or network. The collected PDUs of all routers and networks form the LSDB for the particular link state routing protocol.

Coherency of the LSDB is needed for link state routing protocols, such as OSPF, to correctly calculate routing information. In order for a NSF-capable router to reload its OSPF routing protocol software, it must be able to download LSA packets received from the neighbors into its LSDB without destroying ("dropping") the adjacencies with those neighbors. An OSPF router typically resynchronizes its LSDB with the LSDB of a neighbor by forcing a finite state machine (FSM) of the neighbor into a particular state, e.g., from a Full state to an ExStart state. The router provides a FSM per neighbor at each of its interfaces and the FSM implements various states of the adjacency between the router and its neighbor.

Yet, the OSPF standard RFC 2328 does not allow routers to resynchronize their LSDBs without changing the topological view of the network. That is, RFC 2328 does not define a means to resynchronize the databases between two neighbors without "flapping" (i.e., bringing down) the adjacency between the neighbors. Bringing down the adjacency generally disrupts traffic; this is particularly significant if the router supports failure recovery and is still capable of forwarding traffic. Moreover, bringing down all adjacencies of the router creates unnecessary network events, forcing all routers in the network to compute alternate paths.

According to the OSPF standard, after two routers have established an adjacency (i.e., the neighbor FSMs have reached Full state), the routers announce the adjacency states in their router-LSAs. The asynchronous flooding algorithm ensures that the LSDBs of the routers maintain synchronization in the presence of topology changes. However, if routers need to resynchronize their LSDBs, they cannot do so without placing the neighbor FSMs into the ExStart state. This effectively causes the adjacencies to be removed from the router-LSA packets, which may not be acceptable in some cases such as, e.g., when a NSF router restarts after reloading its routing protocol software.

Specifically, restarting of the NSF router should not impact forwarding operations. To that end, the router (i) relearns its prior existing neighbors in order to maintain those existing adjacencies and (ii) acquires all LSA packets of the neighbors to ensure coherency of its LSDB and, ultimately, its routing tables. These actions are preferably transparent to the neighbors so that they do not place their neighbor FSMs (and their adjacencies with the NSF router) into the ExStart state. Placing the neighbor FSMs into the ExStart state destroys ("drops") the adjacencies with the NSF router and causes the neighbors (and other routers) to stop listing those adjacencies in their router-LSAs. This eventually leads to rerouting of traffic around the NSF router, thus making the router non-NSF capable. Yet, as noted, LSDB resynchronization typically requires that the neighbor FSMs be placed in the ExStart state.

Therefore, an object of the present invention is to provide an efficient technique whereby a NSF router may resynchronize its LSDB with the LSDB of a neighbor without destroying the OSPF adjacency with the neighbor.

Another object of the present invention is to provide a technique that enables neighbors to keep listing the NSF router in their router-LSA packets during resynchronization of the NSF router's LSDB.

SUMMARY OF THE INVENTION

The present invention comprises a method and apparatus that resynchronizes a link state database (LSDB) of a non-stop forwarding (NSF) router with the LSDB of a neighboring router ("neighbor") while maintaining an existing adjacency with the neigh-neighbor in a computer network. To that end, an out-of-band (OOB) resynchronization process executes on the routers to essentially maintain the existing adjacency between the router and neighbor, rather than resetting that adjacency as defined by a conventional resynchronization approach. By keeping the adjacency "up" from the perspective of a routing protocol, such as the Open Shortest Path First (OSPF) routing protocol, the adjacency can be used for continued data traffic to and from the NSF router.

In accordance with an aspect of the invention, an indicator is provided in a conventional OSPF packet that specifies actual use of the packet in the performance of OOB resynchronization between the routers. The novel indicator may comprise either (i) a new packet type or (ii) a new flag in the conventional OSPF packet. The new packet type is preferably a "type 6" database description (DBD) packet whose function is substantially identical to that of a conventional type 2 DBD packet, with the exception that it is specifically directed to OOB LSDB resynchronization. The new flag is preferably an R bit defined within a vector of bits that is located adjacent to an options field of the DBD packet. When asserted, the R bit indicates that the DBD packet is actually used for OOB resynchronization. In accordance with another aspect of the invention, a LSDB resynchronization (LR) bit is provided that announces the capability of the NSF router and its neighbors to support OOB resynchronization. The LR bit is provided in a link-local signaling (LLS) extended options data block that attaches to the conventional OSPF packet.

Additionally, a restart signal (RS) bit is also introduced into the LLS block. When the NSF router restarts, it asserts the RS bit in Hello packets to notify its neighbors, which are capable of performing OOB resynchronization, to continue announcing the adjacency with the NSF routers as "Full".

Specifically, the LLS extended options data block enables attachment of additional data to a conventional OSPF packet, such as a Hello or DBD packet. The additional data is configured according to a conventional type (T) length (L) and value (V) format that includes a novel extended options field. The extended options field is preferably a vector of bits (i.e., a bit vector), although the TLV does have to be a bit vector. According to yet another aspect of the invention, an extended options TLV (EO-TLV) is defined that essentially provides an extension to a conventional OSPF options field typically used in DBD and Hello packets to announce conventional capabilities supported by an OSPF router. As described herein, the LR bit is contained in the extended options field of the EO-TLV.

Operationally, when a neighbor receives a Hello packet with an asserted RS bit over an adjacency with the NSF router, it asserts an OOB resynchronization flag on that adjacency (i.e., on a neighbor data structure associated with that adjacency). The neighbor then follows a conventional LSDB resynchronization procedure with the exception that it continues announcing the adjacency as "Full" even though the NSF router is resynchronizing its LSDB with the neighbor. Thus, the adjacency remains "up" during LSDB resynchronization from the perspective of certain parts of OSPF code executing on the "resynchronizing" neighbors, but entirely (100%) from the perspective of other routers in the network. This is because these neighbors are announcing their adjacency to the other routers in the network as "Full". Therefore, the other routers continue to forward traffic to the NSF router.

In summary, the present invention obviates a situation where, when a NSF router starts resynchronization of its LSDB database, its neighbors bring down the adjacencies existing with the router to the ExStart state and, hence, do not list those adjacencies in their router-LSAs. The inventive mechanism described herein thus informs the neighbors that the LSDB resynchronization is performed "out-of-band" and that the neighbors should not stop listing the adjacencies and their router-LSA packets. This, in turn, enables the NSF router to continue packet-forwarding operations within the computer network.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
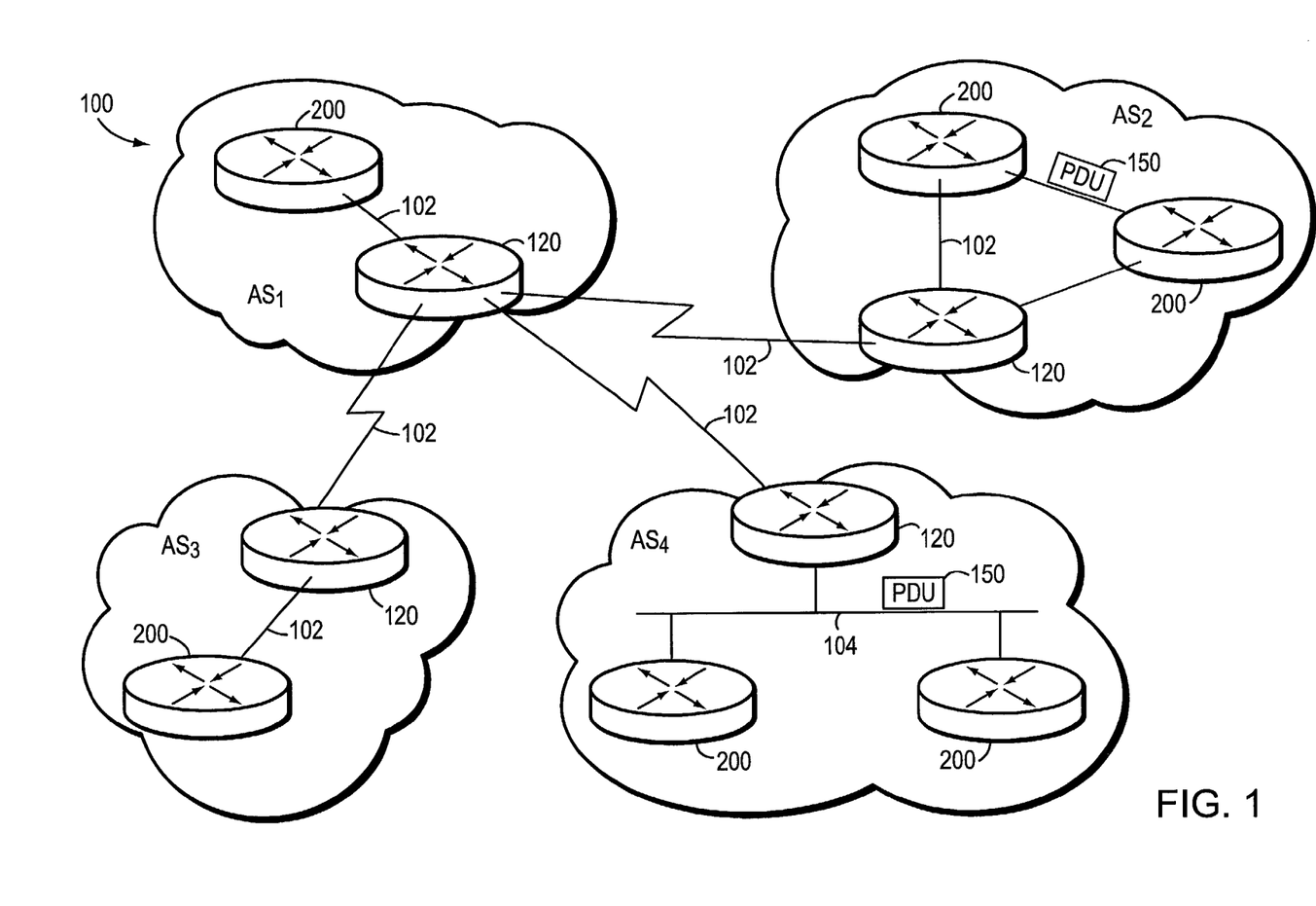
FIG. 1 is a schematic block diagram of a computer network comprising a plurality of autonomous systems or routing domains including intermediate nodes, such as intradomain routers.

FIG. 1 is a schematic block diagram of a computer network 100 comprising a plurality of routing domains or autonomous systems interconnected by intermediate nodes, such as conventional interdomain routers 120 and intradomain routers 200. The interdomain routers 120 interconnect various autonomous systems ($AS_{1-4}$), whereas the intradomain routers 200 manage communication media and nodes within their respective AS domains. The communication media include shared medium networks 104, such as local area network (LAN) subnetworks, point-to-point links 102 and non-broadcast multi-access (NBMA) clouds such as frame relay or asynchronous transfer mode networks. Communication among the routers is typically effected by exchanging discrete data units or packets in accordance with predefined protocols, such as the Transmission Control Protocol/Internet Protocol (TCP/IP). It will be understood to those skilled in the art that other protocols, such as the Internet packet exchange (IPX) protocol and associated link state routing protocols (e.g., NLSP), may be advantageously used with the present invention.

Figure 2:
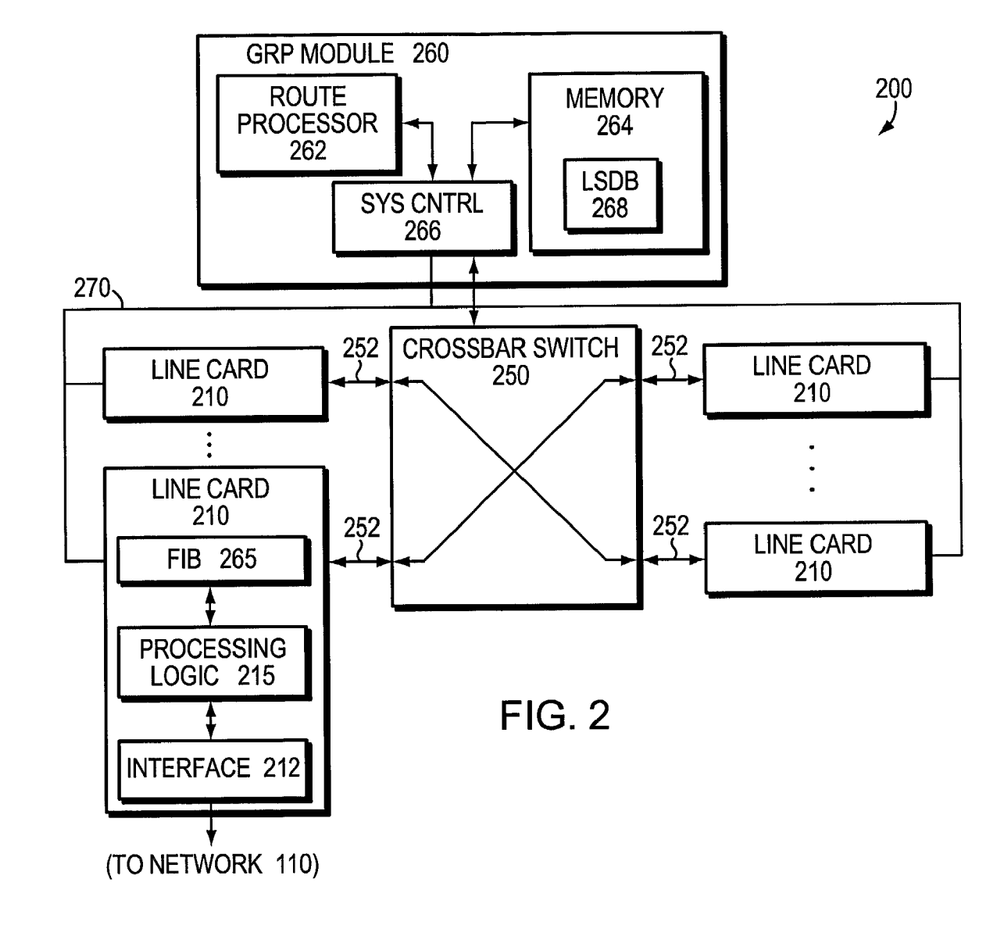
FIG. 2 is a schematic block diagram of a router that may be advantageously used with the present invention.

FIG. 2 is a schematic block diagram of an intradomain router 200. An example of the router 200 that may be illustratively used with the present invention is the GSR 12000 series gigabit switch router (GSR) available from Cisco Systems, Inc. The router 200 is preferably based on a high-speed distributed architecture optimized for routing and packet forwarding functions. To that end, the router comprises a gigabit route processor (GRP) module 260 and a plurality of line cards 210 interconnected by a crossbar switch 250. The crossbar switch 250 is a multi-gigabit crossbar switching fabric configured to provide high-capacity switching operations at gigabit rates among the line cards over point-to-point serial data lines 252. Each line card 210 includes at least one interface 212 comprising circuitry needed to connect the router to a communication medium of the network. Each line card 210 further includes conventional processing logic 215 needed to perform the packet-forwarding functions for the router.

The GRP module 260 is a processor-based, routing system suite comprising functionality incorporated within a typical router. That is, the GRP module comprises a route processor 262 coupled to a memory 264 via a system controller 266. The memory 264 may comprise synchronous dynamic random access memory (SDRAM) storage locations addressable by the processor 262 for storing software programs and data structures. A network routing operating system, portions of which are typically resident in memory and executed by the route processor, functionally organizes the router by, inter alia, invoking network operations in support of software processes executing on the router. It will be apparent to those skilled in the art that other memory means, including various computer readable media, may be used for storing and executing program instructions pertaining to the operation of the router.

The route processor 262 performs configuration management and control functions for the router 200 and communicates with neighboring peer routers to exchange protocol data units (PDUs) used to construct routing tables in accordance with conventional routing algorithms. The route processor also computes and loads forwarding information base (FIB) tables 265 used by the line cards 210. A copy of the FIB tables 265 computed by the route processor 262 is distributed to each line card 210 over a management control bus 270. Each "source" line card performs an independent lookup of a destination address for each incoming packet using a local copy of the FIB table and then forwards the packet over the crossbar switch 250 to a "destination" line card.

The functional infrastructure of the router 200 is preferably divided into a data plane and a control plane. The data plane includes components used to retrieve data packets from the network and provide those packets to forwarding logic of the router (and vice versa). In contrast, the control plane includes those entities used to manage/control traffic forwarding operations of the router. In the illustrative embodiment, the infrastructure of the router includes distributed processing logic 215 configured to perform packet forwarding operations and physical port interfaces 212 resident on the line cards 210 that do not have direct access to the route processor 262 over the data plane. This infrastructure allows the router to continue performing traffic forwarding operations throughout the data plane in the presence of a failure or software reload within the control plane. In essence, the infrastructure enables the intradomain router 200 to function as a non-stop forwarding (NSF) capable router.

Figure 3:
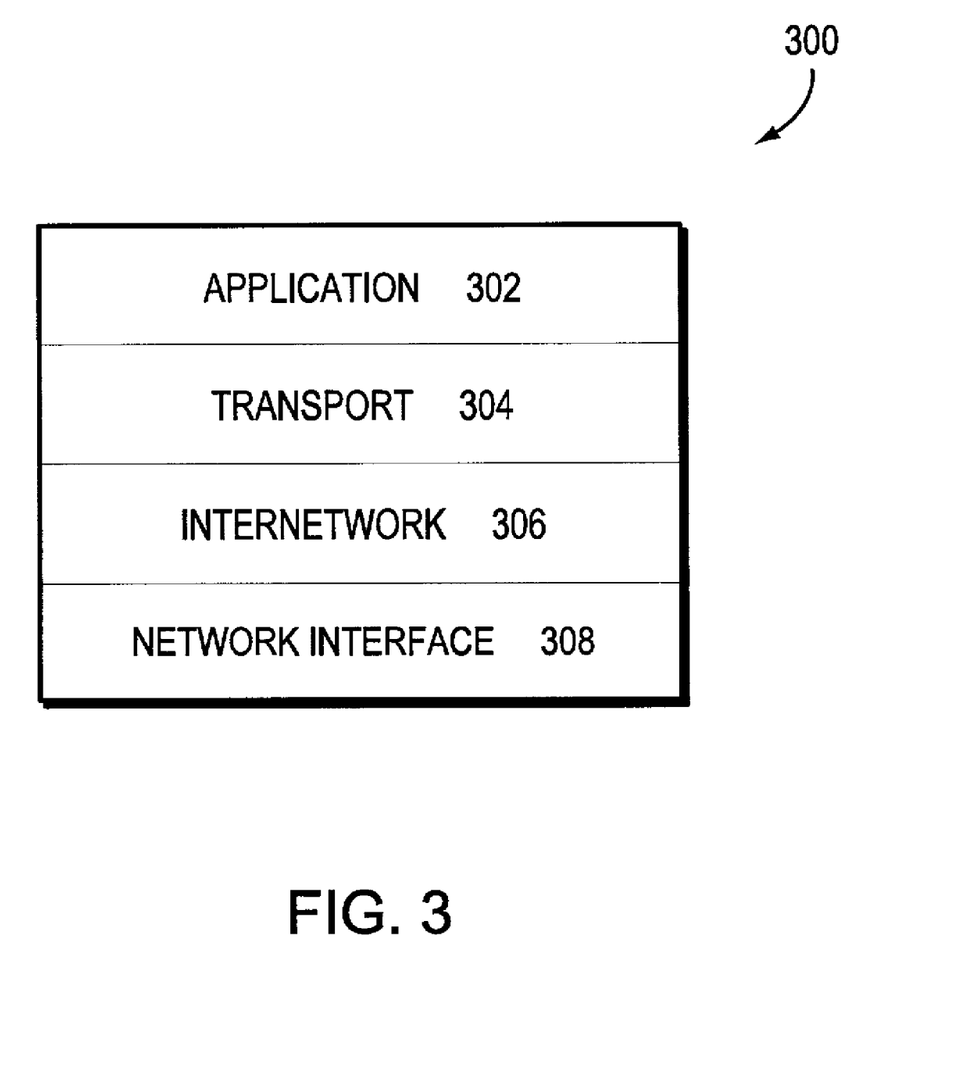
FIG. 3 is a schematic block diagram of a conventional protocol stack, such as the Internet communications protocol stack, within the router of FIG. 2.

A key function of the router is determining the next node to which a packet is sent; in order to accomplish such "routing" the routers cooperate to determine optimal paths (i.e., "best links") through the computer network 100. The routing function is preferably performed by an internetwork layer of a conventional protocol stacked within each router. FIG. 3 is a schematic block diagram of a conventional protocol stack, such as the Internet communications protocol stack 300. The architecture of the Internet protocol stack 300 is represented by four layers termed, in ascending interfacing order, the network interface layer 308, the internetwork layer 306, the transport layer 304 and the application layer 302.

The lower network interface layer 308 is generally standardized and implemented in hardware and firmware, whereas the higher layers are typically implemented in the form of software. The primary internetwork layer protocol of the Internet architecture is the Internet protocol (IP). IP is primarily a connectionless protocol that provides internetwork routing, fragmentation and assembly of exchanged packets—generally referred to as "datagrams" in an Internet environment—and which relies on transport protocols for end-to-end reliability. An example of such a transport protocol is the Transmission Control Protocol (TCP) which is implemented by the transport layer 304 and provides connection-oriented services to the upper layer protocols of the Internet architecture. The term TCP/IP is commonly used to denote the Internet architecture.

In particular, the internetwork layer 306 concerns the protocol and algorithms that the routers 200 utilize so that they can cooperate to calculate paths through the computer network 100. An intradomain protocol may be used to perform intradomain routing (for the Internetwork layer) within each AS of the computer network 100. An example of a protocol used to distribute routing information between neighboring routers belonging to a single AS is the Open Shortest Path First (OSPF) link state routing protocol. The OSPF routing protocol is well known and described in detail in *Request for Comments (RFC) 2328, OSPF version 2*, by J. Moy (1998) and *Interconnections, Second Edition* by R. Perlman, published by Addison Wesley Publishing company (2000).

In a link state routing protocol, each intradomain router maintains a link state database (LSDB 268, shown in FIG. 2) and each participating intradomain router has an identical LSDB. Each individual piece of the LSDB is a particular router's local state (e.g., the router's usable interfaces and reachable neighbors) that is distributed by the router throughout the AS in accordance with a flooding algorithm. The reachable neighbors (e.g., other intradomain routers 200 within $AS_{2,4}$ of FIG. 1) are associated with the intradomain router through an adjacency relationship that enables the exchange of routing information between the routers. This adjacency relationship is established and maintained using a conventional Hello protocol defined by the OSPF routing protocol.

Figure 4:
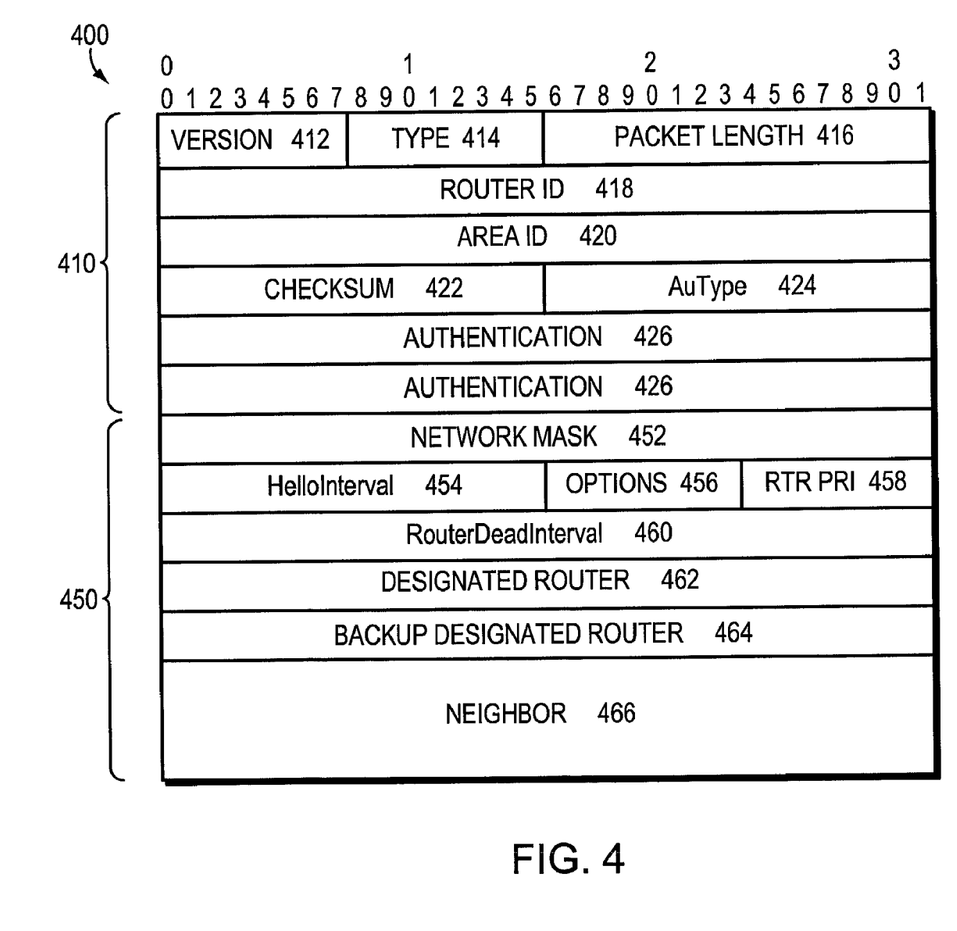
FIG. 4 is a schematic block diagram depicting the format of a Hello packet that may be advantageously used with the present invention.

FIG. 4 is a schematic block diagram depicting the format of a conventional Hello packet 400 comprising an OSPF packet header 410 and Hello-specific packet fields 450. All OSPF packets are encapsulated within IP packets and each OSPF packet, such as a Hello packet, starts with a standard 24-byte OSPF header 410. The header contains information needed to determine whether the packet should be accepted for further processing. The Hello packet is an OSPF type 1 packet that is periodically sent over interfaces of the router to establish and maintain neighbor adjacencies. All routers connected to a common network must agree on certain parameters, such as HelloInterval and RouterDeadInterval, included in the Hello packet. It should be noted that disagreement over these parameters may inhibit the forming of the neighbor adjacencies.

The OSPF packet header 410 includes a version field 412 containing the OSPF version number, a type field 414 containing the type of OSPF packet and a packet length field 416 including the length of the OSPF protocol packet in bytes. The header 410 also includes a router ID field 418 containing the router identifier (ID) of the source of the packet and an area ID field 420 whose contents identify the area to which the packet belongs. A checksum field 422 containing a standard IP checksum of the entire contents of the packet, starting with the OSPF packet header but excluding a 64-bit authentication field. An authentication type (AuType) field 424 identifies the authentication procedure to be used for the packet and authentication field 426 contains a 64-bit value for use by the authentication scheme.

The Hello-specific packet fields 450 include a network mask field 452 identifying the network mask associated with the particular router interface. A HelloInterval field 454 contains a value representing the number of seconds between Hello packets issued by the router, while an options field 456 identifies optional capabilities supported by the router. A router priority value is contained in a router priority (Rtr Pri) field 458 and a RouterDeadInterval field 460 includes a value (i.e., an "inactivity timer") indicating the number of seconds before declaring a silent router down. A designated router field 462 identifies the designated router (DR) for the network, whereas a backup designated router field 464 identifies the backup designated router (BDR) for the network. Lastly, a neighbor field 466 contains the router ID of each router from whom valid Hello packets have been recently received over the network.

When a NSF-capable router reloads its routing software (e.g., OSPF routing protocol software module) it does not actively send Hello packets since it does not know its neighbors. If the router sends Hello packets that do not contain the router IDs of the neighbors, those neighbors destroy the existing adjacencies. To avoid such a situation, it is desirable to make an OSPF routing module reload sequence transparent to the NSF router's neighbors. To that end, a technique is provided that maintains those existing adjacencies between the NSF router and its neighbors during reload of a new instance of the OSPF software. An example of such a technique is disclosed in co-pending and commonly-assigned U.S. patent application Ser. No. 09/925.827, titled titled, Technique for Restoring Adjacencies in OSPF in a Non-Stop Forwarding Intermediate Node of a Computer Network, which application is hereby incorporated by reference as though fully set forth herein.

Figure 5:
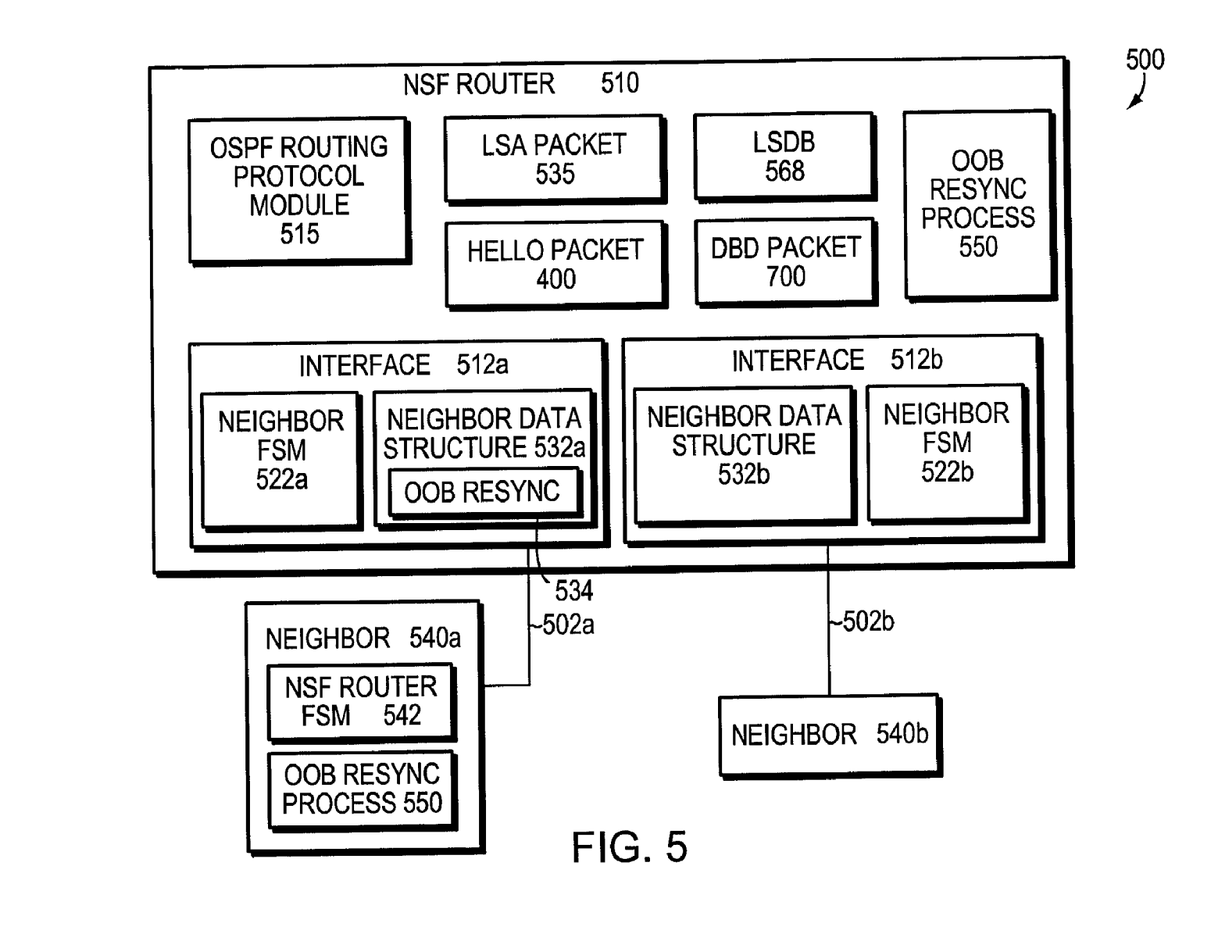
FIG. 5 is a schematic block diagram of a network configuration having adjacencies between the router and its neighbors.

FIG. 5 is a schematic block diagram of a network configuration 500 having adjacencies 502a,b between a NSF router 510 and its neighbors 540a,b over a broadcast interface 512a and a point-to-point interface 512b of the router. Assume an OSPF routing module 515 of the NSF router is reloaded and the router has "picked up" the adjacencies 502a,b with its neighbors using, e.g., the technique described above such that the router "knows" all of its previous neighbors. The router then requests all link state advertisement (LSA) packets 535 from its neighbors because its LSDB 568 is in a re-initialized "empty" condition due to the reloading/restarting of the OSPF software. The format of the LSA packet is well known and described in RFC 2328. Thus, an LSDB resynchronization sequence is performed to resynchronize the router LSDB with that of its neighbor. To initiate resynchronization of its LSDB with each neighbor LSDB, a router typically (i.e., in a non-NSF fashion) places a conventional finite state machine (FSM 522a,b) associated with each neighbor in a particular state, e.g., an ExStart state.

Figure 6:
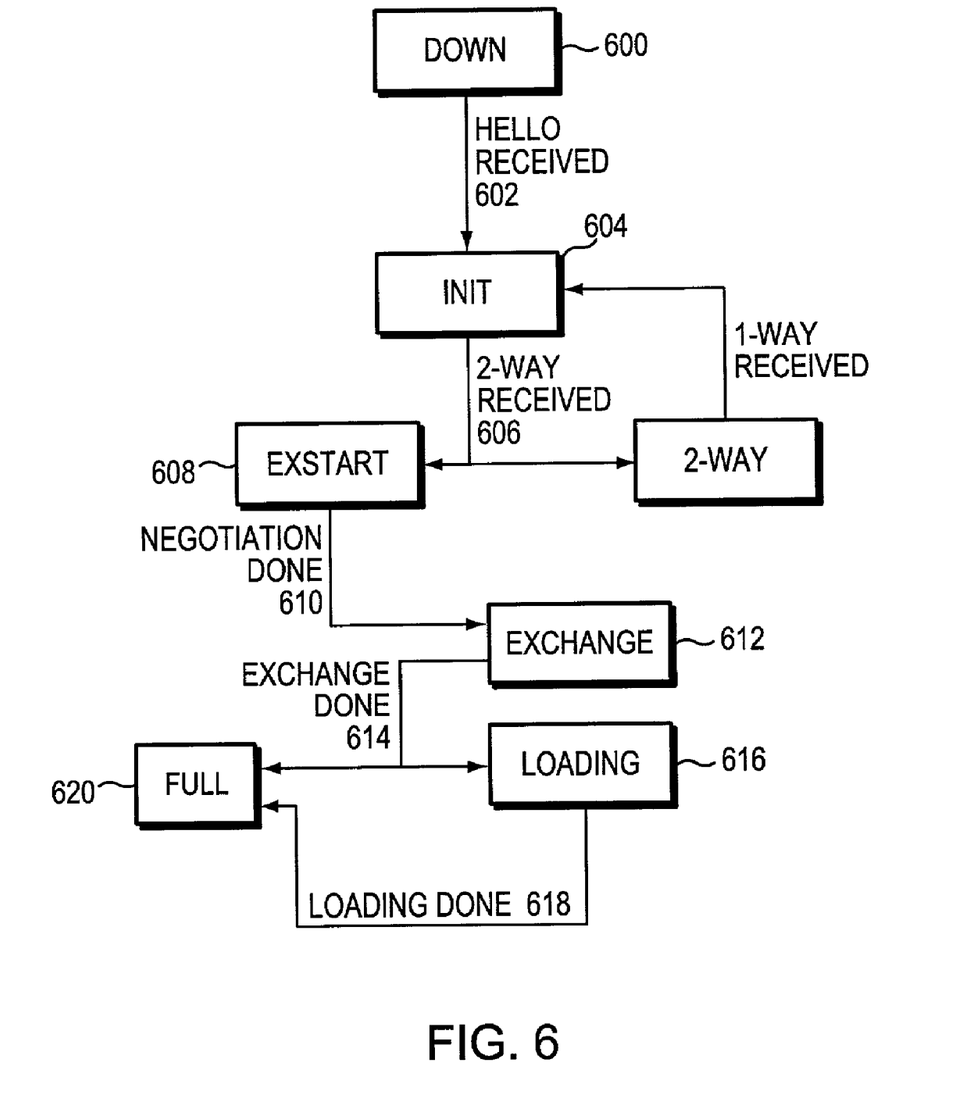
FIG. 6 is a state diagram illustrating various states of a finite state machine associated with a neighbor of the router.

FIG. 6 is a state diagram illustrating various states of the neighbor as provided by a neighbor FSM. The ExStart state 608 represents the first step in creating an adjacency that allows an OSPF process executing on a neighbor to send initial database description (DBD) packets to the router. DBD packets are OSPF type 2 packets that are exchanged when an adjacency is being initialized. A DBD packet describes the contents of the LSDB and typically multiple DBD packets are used to describe the LSDB. For this purpose, a poll-response procedure is used wherein one of the routers is designated a master and the other is designated a slave. The master sends DBD packets (polls) which are acknowledged by DBD packets sent by the slave (responses). The responses are linked to the polls via DD sequence numbers of the packets.

Figure 7:
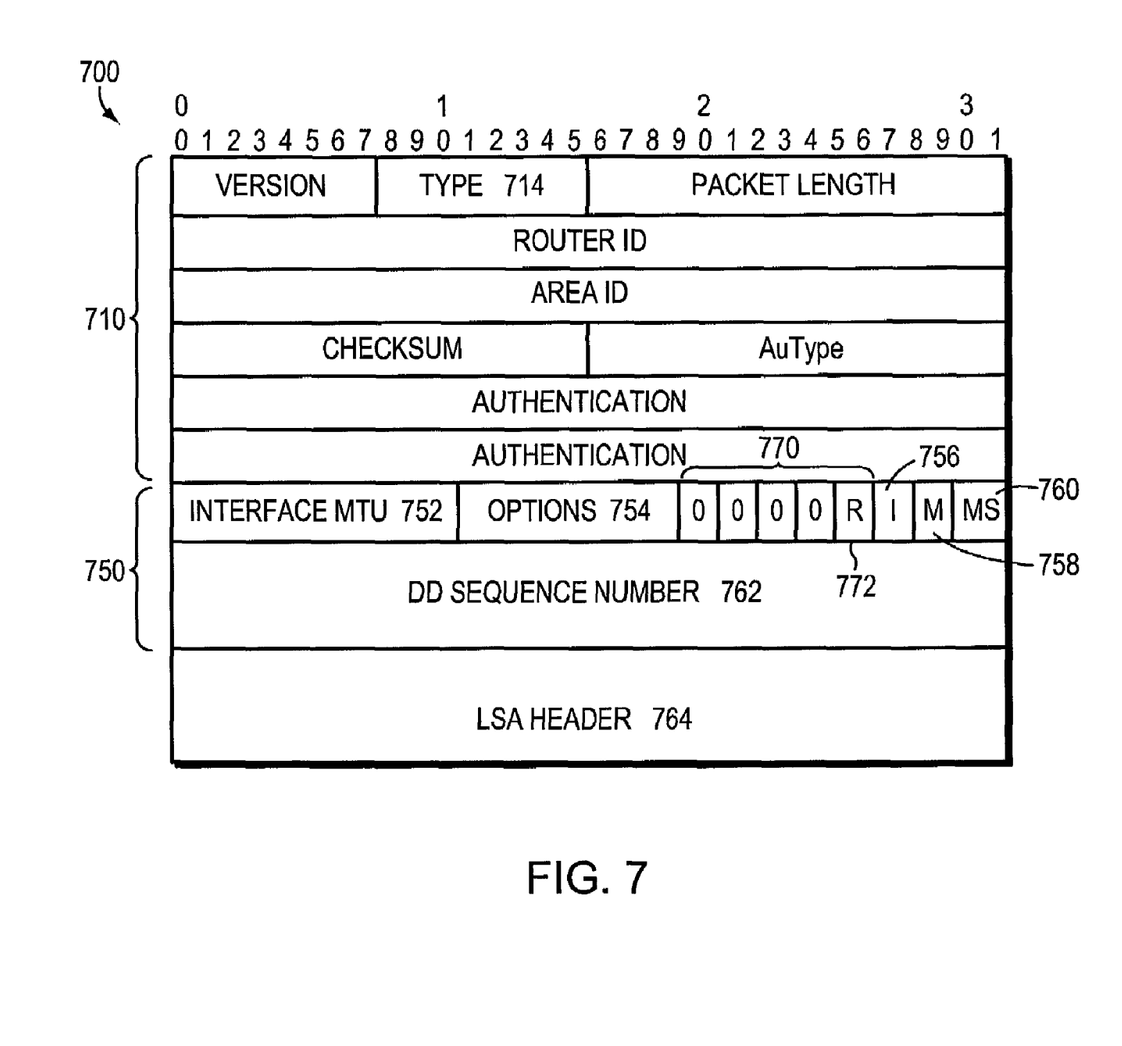
FIG. 7 is a schematic block diagram depicting the format of a database description (DBD) packet that may be advantageously used with the present invention.

FIG. 7 is a schematic block diagram depicting a DBD packet 700 that may be advantageously used with the present invention. The DBD packet 700 includes an OSPF header 710 similar to the OSPF 410 of the Hello packet 400. In addition, the DBD packet comprises DBD-specific packet fields 750, including an interface MTU field 752 containing the size in bytes of the largest IP datagram that can be sent out the associated interface without fragmentation. The fields 750 also include an options field 754 that identifies optional capabilities supported by the router, and various bit fields (I-bit 756, M-bit 758 and MS-bit 760). A DD sequence number field 762 is used to sequence the collection of DBD packets, while an LSA header field 764 contains a list of link-state database pieces, as identified by LSA headers.

Referring to again FIGS. 5 and 6, assume the NSF router 510 has not yet received any Hello packets 400 from neighbor 540a over broadcast interface 512a. A neighbor data structure 532a is created for neighbor 540a when a first incoming Hello packet is received at the NSF router from neighbor 540a. The neighbor FSM 522a then moves from a Down state 600 to an Init state 604. The neighbor FSM 522a remains in this state until the neighbor 540a lists the NSF router 510 in its Hello packets. The event HelloReceived 602 indicates reception of a Hello packet that may or may not list the NSF router. When the NSF router receives an incoming Hello packet from neighbor 540a that contains its (the NSF router's) router ID, it implies that the NSF router has also listed neighbor 540a in the Hello packets it sends over the interface 512a.

Once the neighbor data structure 532a is created for neighbor 540a, the NSF router sends Hello packets 400 with neighbor 540a listed in the packets. This same sequence occurs with the remote neighbor 540a. Upon the NSF router receiving an incoming Hello packet 400 from neighbor 540a with the NSF router's ID listed in the packet, there is 2-way communication between the router 510 and neighbor 540a. This condition is needed to generate a 2-Way Received event 606, which transitions the neighbor FSM 522a from the Init state 604 to, e.g., the ExStart state 608.

In the ExStart state 608, the NSF router 510 begins LSDB synchronization with its neighbor 540a. That is, the router and neighbor negotiate as to the master/slave status of each router and as to the intitial sequence number for the DBD packets to be exchanged. Upon completion of negotiation (Negotiation Done 610), the neighbor FSM 522a transitions to an Exchange state 612 where the DBD packets 700 are received, i.e., where the neighbor reliably exchanges its database description with the router. Once the DBD packets 700 are reliably exchanged (Exchange Done 614), it is known which, if any, LSA packets 535 are still needed from the neighbor X. If any LSA packets are needed, the neighbor FSM 522a transitions to a Loading state 616 where the needed packets are requested. Once the list of requested LSA packets is empty or there are no further LSA packets requested (Loading Done 618), the neighbor FSM 522a transitions to a Full state 620.

After reaching the Full state, if the NSF router receives an initial DBD packet 700 from neighbor 540a, it forces its neighbor FSM 522a back to the ExStart state 608. This may indicate that routing software on neighbor 540a has been restarted/reloaded and that neighbor 540a has received a Hello packet 400 from the NSF router that lists the neighbor 540a. However, forcing the neighbor FSM 522a into the ExStart state 608 causes the neighbor 540a to do the same action, i.e., transition ("move") its neighbor (i.e., NSF router) FSM 542 from the Full state 620 to the ExStart state 608. This results in destroying ("dropping") of the adjacency 502a between the NSF router 510 and neighbor 540a such that transit data traffic cannot be forwarded over the corresponding interface 512a of the router 510. Such a situation prevents the router 510 from functioning as a NSF-capable router. Yet, an OSPF router, such as NSF router 510, typically resynchronizes its LSDB with the LSDB of a neighbor by forcing the neighbor FSM into the ExStart state. The present invention is directed to a technique that allows a NSF router to resynchronize its LSDB with the LSDB of a neighbor without disturbing the adjacency with its neighbor.

Specifically, the present invention comprises a method and apparatus for resynchronizing the LSDB of the NSF router with the LSDB of its neighbor while maintaining an existing adjacency with the neighbor in a computer network. To that end, an out-of-band (OOB) resynchronization process 550 executes on the router 510 and neighbor 540 to essentially maintain their existing adjacency, rather than resetting that adjacency as defined by a conventional OSPF resynchronization approach. By keeping the adjacency "up" from the perspective of a routing protocol, such as the OSPF routing protocol, the adjacency can be used for continued data traffic to and from the NSF router.

According to an aspect of the invention, an indicator is provided in a conventional OSPF packet that specifies actual use of the packet in the performance of OOB resynchronization between the routers. As described herein, the novel indicator may comprise either (i) a new packet type or (ii) a new flag in the conventional OSPF packet. According to another aspect of the invention, a LSDB resynchronization (LR) bit is provided that announces the capability of the NSF router and its neighbors to support OOB resynchronization. The LR bit is provided in a link-local signaling (LLS) extended options data block that attaches to the conventional OSPF packet.

As part of a conventional resynchronization procedure, the NSF router exchanges DBD packets with the neighbor. To perform link-local signaling, the NSF router appends (attaches) a novel data block to the end of the DBD packets or immediately after the authentication data block when cryptographic authentication is used. Like the OSPF cryptographic authentication, the length of the LLS block is not included into the length of the OSPF packet, but is included in the IP packet length.

Figure 8:
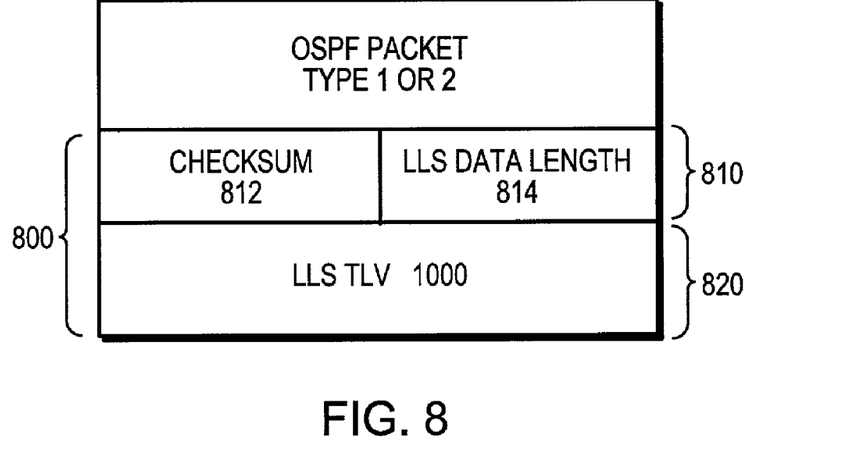
FIG. 8 is a schematic block diagram illustrating the format of a LLS data block in accordance with the present invention.

FIG. 8 is a schematic block diagram illustrating the format of the LLS data block 800. The LLS data block may be attached to OSPF packets of two types: type 1 (Hello packets) and type 2 (DBD packets). Only the initial DBD packet (i.e., the packet with the I-bit 756 asserted) may carry the LLS data block. The data included in the LLS block 800 attached to a Hello packet may be used for dynamic signaling, since a Hello packet may be sent at any time; however, delivery of the LLS data in the Hello packet is not guaranteed. The data sent with an initial DBD packet is guaranteed to be delivered as soon as the adjacency proceeds from ExStart state, but this information may not change dynamically since sending of an initial DBD packet brings the adjacency to the ExStart state.

Figure 10:
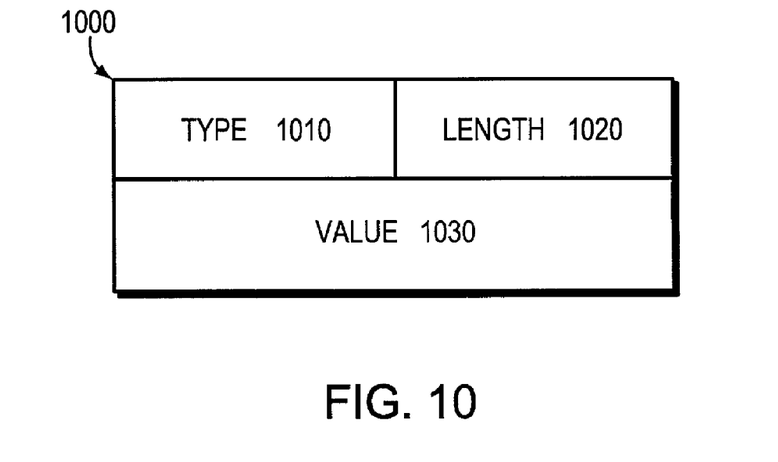
FIG. 10 is a schematic block diagram illustrating the format of a TLV that may be advantageously used in accordance with the present invention.

The LSS data block 800 comprises a header 810, including a checksum field 812 and a 16-bit LSS data length field 814, along with a payload 820. The checksum field 812 contains a standard IP checksum of the entire contents of the LLS block. The LLS data length field 814 contains the length (in 32-bit words) of the LLS block, including the header and payload. The payload 820 contains a set of type/length/value (TLV 1000) triplets as described below. The contents of the LLS data block are constructed using TLVs. All TLVs 1000 are preferably 32-bit aligned (with padding if necessary).

Figure 9:
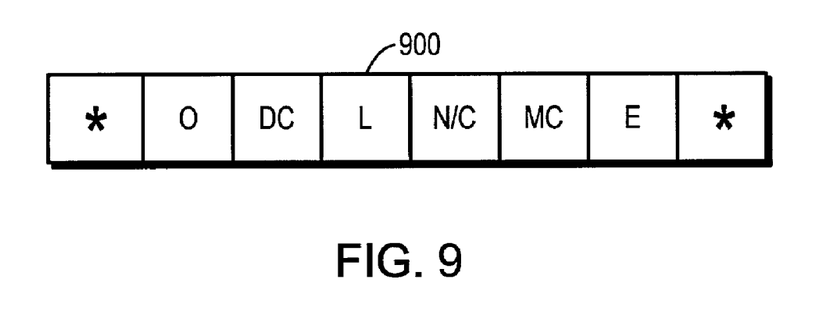
FIG. 9 is a schematic block diagram illustrating a L-bit within options field of a packet, such as the Hello or DBD packet.

According to another aspect of the invention, routers assert a novel bit within the OSPF Hello and DBD packets to indicate that the packets contain a LLS data block 800. The novel bit is a LLS (L) bit that is preferably provided within the options field of those packets. FIG. 9 is a schematic block diagram illustrating the L-bit 900 within the options field of a conventional OSPF packet, such as options field 456 of the Hello packet 400 and options field 754 of the DBD packet 700. In the illustrative embodiment, the value of the L-bit is 0x10. The L bit is asserted only within Hello and DBD packets when indicating inclusion of a LLS data block 800. That is, the L bit as defined herein is not asserted in OSPF LSAs 535, although the bit may be used in those packets for a different purpose.

Figure 11:
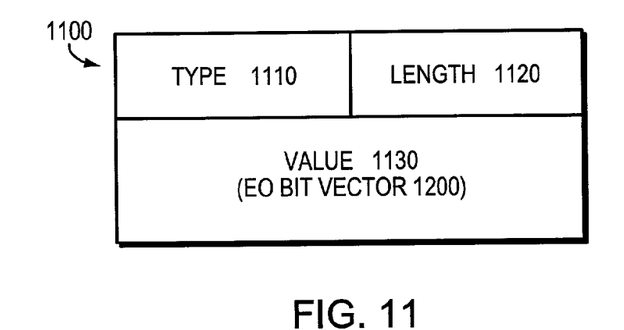
FIG. 11 is a schematic block diagram depicting the format of an EO-TLV that may be advantageously used with the present invention.

FIG. 10 is a schematic block diagram illustrating the format of a TLV 1000. A type field 1010 contains a TLV identifier (ID) that is unique for each type of TLV. A value field 1030 contains arbitrary data and a length field 1020 contains the length of the value field 1030 (in bytes) that is variable. Each TLV 1000 is padded to a 32-bit boundary, though padding bytes are not included in the length field 1020. However, the padding bytes are included in the LLS data length field 814 of the LLS block header 800. An example of a predefined TLV is an extended options (EO)-TLV 1100.

Figure 12:
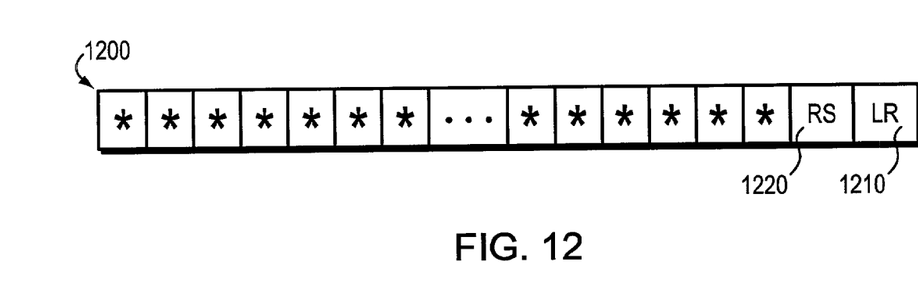
FIG. 12 is a schematic block diagram illustrating the format of an EO bit vector including a LR bit and RS bit in accordance with the present invention.

FIG. 11 is a schematic block diagram depicting the format of the EO-TLV 1100. The EO-TLV 1100 preferably appears only once in the LLS data block 800. A type field 1110 stores the TLV ID of the EO-TLV, which is preferably a value of one (1). A value field 1130 contains an extended options (EO) bit vector 1200 used to announce OSPF capabilities that are adjacency (link) specific; consequently, those bits do not have any semantics from the point of view of the LLS data block. Other OSPF extensions may allocate bits in the EO bit vector 1200 to perform boolean link local signaling. A length field 1120 stores the length of the EO bit vector 1200, which is preferably four (4) bytes.

In accordance with another aspect of the invention, a LSDB resynchronization (LR) bit is provided to announce the capability of supporting OOB resynchronization process among the NSF router and its neighbors. The LR bit is stored within the LLS data block 800 and, in particular, within the EO bit vector 1200 of the EO-TLV 1100. FIG. 12 is a schematic block diagram illustrating the format of the EO bit vector 1200 including the LR bit 1210. The EO bit vector 1200 is preferably contained with the LLS data block 800 attached to an initial DBD packet. The LR bit 1210 is asserted in the initial DBD packet to "announce" the NSF router's capability to perform OOB resynchronization. Accordingly, the value of the EO bit vector 1200 having an asserted LR-bit 1210 is preferably 0x00000001. Notably, the LR bit is not used as an indication that the initial DBD packet is used for resynchronization; that is, the LR bit 1210 is used in that DBD packet only to announce the router's capability to perform (support) OOB resynchronization.

To actually perform OOB resynchronization, the routers send standard DBD packets 700 with (i) a different packet type in the OSPF packet header or (ii) a different bit asserted in the OSPF packet. Although the illustrative embodiment uses a LLS data block 800 to announce OOB resynchronization capability, that capability can be announced using other methods. For example, any unused bit in the options field of a standard OSPF packet may be used to announce such a capability. In the illustrative embodiment, an unused bit within a vector 770 of bits located to the right of the options field 754 in the DBD packet 700 is defined to specify actual performance of OOB resynchronization. The unused bit is referred to as the Resynchronization (R) bit 772 and is preferably located to the immediate left of the I-bit 756. When asserted, the R bit 772 indicates that the DBD packet 700 is actually used for OOB resynchronization.

Refer also to FIG. 5. Assume that NSF router 510 reloads the OPSF routing protocol software 515 when updating that software to a new version. In a generic router operating system that enables reloading of a specific component (feature) of the system, the current OSFP process is stopped and the newer version is restarted without stopping other routing protocol features of the operating system. When the new OSPF process restarts, the router sends Hello packets 400 with the RS bit 1220 asserted within a predefined LLS-TLV attached to the packets to thereby acquire a list of previous, existing neighbors. Once the list of existing neighbors is acquired, the NSF router begins resynchronization of its LSDB 568. The NSF router examines incoming Hello packets from its neighbors to determine whether the EO-TLV 1100 is attached to the packets. If so, the router examines the LR bit 1210 within the TLV to determine whether the neighbors are capable of supporting OOB resynchronization. Announcement of the OOB resynchronization capability within the Hello packet is needed because, during restart, the routers only see Hello packets (and not DBD packets).

If the LR bit 1210 is asserted in the incoming Hello packet, the NSF router 510 marks the neighbor data structure 532 (for the neighbor) with a novel OOBResync flag 534 that indicates OOB resynchronization with that neighbor. The NSF router then places the neighbor FSM 522 (and the adjacency) for that neighbor into the ExStart state 608. The OOBResync flag 534 is stored in the neighbor data structure 532 so that, when the flag is asserted, a DBD packet generation procedure within the router is changed to assert the R bit 772 in the generated DBD packet. The router sends the DBD packet 700 and R bit 772 to the neighbor when the neighbor FSM 522 is in the ExStart State. When in this state, specific timers needed, e.g., to send initial DBD packets are started.

Specifically, the OOBResync flag 534 is asserted when the router is initiating performance of the OOB LSDB resynchronization procedure with a neighbor. Routers clear the OOBResync flag on the following conditions:

(a) the neighbor data structure is first created;

(b) the neighbor FSM transitions to any state lower than ExStart state; and (c) the neighbor FSM transitions to ExStart state because a DBD packet with R-bit clear has been received;

(d) the neighbor FSM reaches the Full state.

The OOBResync flag may be asserted only if the neighbor FSM is in the ExStart, Exchange or Loading states. If the FSM transitions to any other state, the OOBResync flag is cleared.

When a neighbor FSM 522 is in the ExStart State 608, the router typically sends an initial DBD packet to the neighbor. After transitioning the neighbor FSM to the Exchange state 612, the router sends sequenced DBD packets to the neighbor. This typical router logic is changed to examine the OOBResync flag 534 in the neighbor data structure 532 and, if it is asserted, the router asserts the R bit 772 in all DBD packets 700 sent to the neighbor. Assertion of the R bit informs the neighbor that NSF router 510 requests the OOB resynchronization procedure that, according to the invention, maintains the existing adjacency between the router and neighbor rather than resetting that adjacency.

It should be noted that if the neighbor is not configured to support OOB resynchronization, it will "fall back" to the standard LSDB synchronization procedure. However, if the neighbor is configured to support OOB resynchronization, it asserts the OOBResync flag in its neighbor data structure (for the NSF router) and thereafter follows the new OOB resynchronization procedure described herein. It should also be noted that assertion of the OOBResync flag not only changes the way the DBD packet is sent, but also changes the way the router considers the neighbor FSM state in certain places of the OSPF code. For example, when a router-LSA is constructed, only those neighbor adjacencies in the Full state are typically listed in that packet. Yet in accordance with the OOB resynchronization invention, if the OOBResync flag is asserted and the neighbor FSM is in the ExStart state or higher, the neighbor adjacency is considered Full from the LSA packet origination perspective.

According to an aspect of the present invention, the novel OOB resynchronization indicator mechanism may comprise a new packet type. This new OSPF packet type is preferably type 6 and the function of the packet is identical to that of the OSPF DBD packet 700, except that it is specifically dedicated for OOB LSDB resynchronization. In addition, a new field is added to the neighbor data structure that indicates that the OOB LSDB resynchronization process is in progress. This field allows OSPF implementation to utilize the existing neighbor FSM code. As noted, the LR bit 1210 is occupied in the EO-TLV 1100 that enables routers to indicate their capability to support the novel OOB resynchronization technique.

It should be noted that routers capable of performing OOB LSDB resynchronization assert the LR bit 1210 in their Hello and DBD packets, whereas those routers actually performing the novel OOB resynchronization technique assert the R bit (or use type 6) in the DBD packets 700. The options field 754 of the initial DBD packet 700 is typically stored in the corresponding neighbor data structure 532; therefore, the router may subsequently check the state of the LR bit 1210 to determine whether a neighbor is capable of performing OOB LSDB resynchronization.

In the illustrative embodiment, the format of the type 6 DBD packet is substantially the same as the format of a type 2 DBD packet except that the type field 714 is set to a value of 6. Type 6 packets are sent to a neighbor instead of type 2 packets when the OOBResync flag 534 for the neighbor is asserted. Type 2 packets are considered invalid if the OOBResync flag is asserted for the neighbor. When a type 6 DBD packet is received and the stored value of the options field for that neighbor does not have an asserted LR bit, the packet is dropped and a SeqNumberMismatch event is generated for the neighbor. When a type 2 or type 6 OSPF packet is received and saved for subsequent detection of a duplicate packet, the packet type is stored as well.

Processing of type 6 DBD packets is performed as follows:

(1) if the I, M, and MS bits 756-760 are asserted and the state of the neighbor FSM is Full 620 and the OOBResync flag 534 is not asserted, the DBD packet 700 is accepted, the OOBResync flag is asserted and the neighbor FSM 522 is placed into the ExStart state 608;

(2) otherwise, if the OOBResync flag 534 is asserted and the state of the neighbor FSM is ExStart, Exchange or Loading, the packet is processed similar to a type 2 packet;

(3) otherwise, if the neighbor state is Full 620 and the receiving router is the slave in the LSDB exchange process, the receiving router should be ready to identify duplicate DBDs of both packet types (type 2 and type 6) from the master and resend the acknowledging packet;

(4) otherwise (the OOBResync flag is de-asserted or the neighbor FSM state is not Full, or the packet is not a duplicate), a SeqNumberMismatch event is generated for the neighbor FSM that, in turn, causes transition to the ExStart state.

It may be necessary to limit the time an adjacency can spend in the ExStart State with the OOBResync flag asserted to the time (seconds) defined by the RouterDeadInterval timer. If the adjacency does not transition from this ExStart state before the timer fires, the neighboring router does not properly process type 6 DBD packets. The requesting router may decide to stop attempting resynchronization of its LSDB over this adjacency if, e.g., the LSDB can be resynchronized via another neighbor on the same segment. In addition, the requesting router may attempt to resynchronize its LSDB using the legacy method by clearing to OOBResync flag and leaving the neighbor FSM in the ExStart State.

For OSPF implementations supporting the novel OOB resynchronization technique, the router logic configured to examine the state of a neighbor FSM is preferably modified as follows:

(1) transitioning a neighbor FSM state from/to the Full state with the OOBResync flag asserted should not cause origination of a new version of router-LSAs or network-LSAs;

(2) explicit checks for the Full state of a neighbor FSM for purposes other than LSDB synchronization and flooding should treat the ExStart, Exchange and Loading states as a Full state, provided that the OOBResync flag is asserted for the neighbor.

In sum, to initiate OOB LSDB resynchronization, the router ensures that the corresponding neighbor supports the inventive technique by checking the LR bit in the options field of the neighbor data structure. If the neighboring router is capable of supporting OOB resynchronization, the OOBResync flag for the neighbor is asserted within the neighbor data structure and the neighbor FSM state is placed into the ExStart state. Using the novel OOB resynchronization technique described herein, it is no longer necessary to bring down the adjacency between a NSF router and its neighbor in order to resynchronize the NSF router LSDB. This effectively obviates generation of new LSA packets that would otherwise trigger SPF computation within all routers of an area. This also keeps the adjacency "up" from the protocol point of view so that the adjacency (link) can be used normally for any data traffic.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for operating a router, comprising:
transmitting a first packet to at least one neighbor router, the first packet informing the at least one neighbor router that the router is a non-stop forwarding (NSF) router and that the router is going to execute an out-of-band (OOB) resynchronization process that maintains an existing adjacency between the router and the at least one neighbor router at all times during the OOB resynchronization;
executing the OOB resynchronization process on the router while maintaining the existing adjacency with the at least one neighbor router by transmitting one or more second packets;
providing a LSDB resynchronization (LR) bit in a link-local signaling (LLS) data block;
attaching the LLS data block to the first packet; and
announcing a capability of the NSF router and the neighboring router to support the OOB resynchronization using a LR bit of the LLS data block.

2. The method of claim 1, wherein the one or more second packets are Database Description (DBD) packets that describe the contents of a link state database (LSDB).

3. The method of claim 1, wherein the existing adjacency is an Open System Shortest Path First (OSPF) adjacency.

4. A method comprising:
transmit a first packet by a non-stop forwarding (NSF) router to announce to a neighboring router that the NSF router has a capability to perform an out-of-band (OOB) resynchronization of a link state database (LSDB), the first packet to include a LSDB resynchronization (LR) bit in a link-local signaling (LLS) data block to indicate the capability of the NSF router to support the OOB resynchronization, wherein the OOB resynchronization is a resynchronization that maintains an existing adjacency between the NSF router and the neighboring router at all times during the resynchronization;
subsequent to transmitting the first packet, transmitting from the NSF router a second packet, the second packet being a database description (DBD) packet descriptive of the LSDB, the DBD packet including an indicator that specifies that the DBD packet is for the OOB resynchronization;
maintaining an adjacency finite state machine associated with the neighboring router in a Full state at all times during the OOB resynchronization; and
announcing, by the neighboring router, that an adjacency between the NSF router and the neighboring router is Full, during the OOB resynchronization.

5. The method of claim 4 wherein the indicator is a packet type of the DBD packet.

6. The method of claim 5 wherein the packet type is a type 6 DBD packet.

7. The method of claim 4 wherein the indicator is a flag in the DBD packet.

8. The method of claim 7 wherein the flag is an R bit defined within a vector of bits located adjacent to an options field of the DBD packet.

9. The method of claim 4 wherein the adjacency is an Open System Shortest Path First (OSPF) adjacency.

10. A system comprising:
a non-stop forwarding (NSF) router configured to transmit a first packet to announce a capability to perform an out-of-band (OOB) resynchronization of a link state database (LSDB), and to subsequently transmit a second packet, the second packet being a Database Description (DBD) packet descriptive of the LSDB, the DBD packet including an indicator that specifies that the DBD packet is for OOB resynchronization, wherein the OOB resynchronization is a resynchronization that maintains an existing adjacency of the NSF router at all times during the resynchronization; and
a neighboring router configured to receive the announcement and the DBD packet, and to maintain an adjacency state machine in a Full state at all times during an OOB resynchronization, the neighboring router further configured to announce during the OOB resynchronization that an adjacency between the NSF router and the neighboring router is Full;
wherein the NSF router is configured to announce the capability to perform the OOB resynchronization with a LSDB resynchronization (LR) bit in a link-local signaling (LLS) data block of the first packet.

11. The system of claim 10 wherein the indicator is a packet type of the DBD packet.

12. The system of claim 11 wherein the packet type is a type 6 DBD packet.

13. The system of claim 10 wherein the indicator is a flag in the DBD packet.

14. The system of claim 13 wherein the flag is an R bit defined within a vector of bits located adjacent to an options field of the DBD packet.

15. The system of claim 10 wherein the adjacency is an Open System Shortest Path First (OSPF) adjacency.

16. An apparatus comprising:
means for transmitting a first packet from a non-stop forwarding (NSF) router to announce to a neighboring router that the NSF router has a capability to perform an out-of-band (OOB) resynchronization of a link state database (LSDB), the first packet including a LSDB resynchronization (LR) bit in a link-local signaling (LLS) data block, wherein the OOB resynchronization maintains an existing adjacency between the NSF router and the neighboring router at all times during the resynchronization;
means for transmitting from the NSF router, subsequent to transmitting the first packet, a database description (DBD) packet descriptive of the LSDB, the DBD packet including an indicator that specifies that the DBD packet is for the OOB resynchronization;
means for maintaining an adjacency finite state machine associated with the neighboring router in a Full state at all times during the OOB resynchronization; and
means announcing that an adjacency between the NSF router and the neighboring router is Full during the OOB resynchronization.

17. The apparatus of claim 16 wherein the indicator is a packet type of the DBD packet.

18. The apparatus of claim 17 wherein the packet type is a type 6 DBD packet.

19. The apparatus of claim 16 wherein the indicator is a flag in the DBD packet.

20. The apparatus of claim 19 wherein the flag is an R bit defined within a vector of bits located adjacent to an options field of the DBD packet.

21. The apparatus of claim 16 wherein the first packet is a Hello packet.

* * * * *

UNITED STATES PATENT AND TRADEMARK OFFICE
CERTIFICATE OF CORRECTION

PATENT NO. : 7,639,680 B1  Page 1 of 1
APPLICATION NO. : 09/971298
DATED : December 29, 2009
INVENTOR(S) : Roy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 922 days.

Signed and Sealed this

Twenty-first Day of December, 2010

David J. Kappos
*Director of the United States Patent and Trademark Office*